US008354183B2

(12) United States Patent
Konuma et al.

(10) Patent No.: US 8,354,183 B2
(45) Date of Patent: Jan. 15, 2013

(54) ADAPTER FOR A POWER TOOL BATTERY PACK

(75) Inventors: Yuuichi Konuma, Hitachinaka (JP); Masateru Niyada, Hitachinaka (JP); Takuya Konnai, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 748 days.

(21) Appl. No.: 12/440,763

(22) PCT Filed: Sep. 20, 2007

(86) PCT No.: PCT/JP2007/068903
§ 371 (c)(1),
(2), (4) Date: Mar. 11, 2009

(87) PCT Pub. No.: WO2008/035811
PCT Pub. Date: Mar. 27, 2008

(65) Prior Publication Data

US 2010/0062326 A1 Mar. 11, 2010

(30) Foreign Application Priority Data

Sep. 20, 2006 (JP) ................................ P2006-254998

(51) Int. Cl.
*H01M 2/36* (2006.01)
*H01M 2/10* (2006.01)
*H02J 7/00* (2006.01)

(52) U.S. Cl. ............. 429/100; 429/95; 429/97; 320/114

(58) Field of Classification Search .................... 429/96, 429/97, 98, 100; 173/217; 320/114
See application file for complete search history.

(56) References Cited

U.S. PATENT DOCUMENTS

| | | | | |
|---|---|---|---|---|
| 4,006,396 | A | 2/1977 | Bogut | |
| 4,186,983 | A | 2/1980 | Kaye | |
| 4,309,067 | A | 1/1982 | Riley, Jr. | |
| 6,729,415 | B1 * | 5/2004 | Huang | 173/217 |
| 6,876,173 | B2 | 4/2005 | Mastaler et al. | |
| 2005/0280394 | A1 | 12/2005 | Kubale et al. | |
| 2006/0113100 | A1 * | 6/2006 | Hsu et al. | 173/217 |

FOREIGN PATENT DOCUMENTS

JP 2001-143678 5/2001

OTHER PUBLICATIONS

Office Action in Chinese Patent Appln. No. 200780033535.7, issued Mar. 5, 2012, (6 pgs, in Chinese), [with English language translation (7 pgs.).

* cited by examiner

*Primary Examiner* — Patrick Ryan
*Assistant Examiner* — Julian Anthony
(74) *Attorney, Agent, or Firm* — Antonelli, Terry, Stout & Kraus, LLP.

(57) ABSTRACT

An adapter includes an insertion part that is inserted into a body of a power tool and has terminals for electrically connecting with the power tool; a pair of rails for guiding insertion of a battery pack in a direction substantially orthogonal to the insertion direction of the insertion part; an operating part constituting tool-latching device for attaching to and detaching from the body of the power tool; and a receiving part constituting battery-latching device for attaching to and detaching from the battery pack. The operating part of the tool-latching device and the receiving-side of the battery-latching device are disposed in different positions when viewing the adapter in the insertion direction of the insertion part.

18 Claims, 11 Drawing Sheets

ADAPTER FOR A POWER TOOL BATTERY PACK

TECHNICAL FIELD

The invention relates to a cordless power tool, and more particularly to an adapter for mounting a battery pack on the power tool.

BACKGROUND ART

Conventionally, cordless power tools have been provided with a detachably mounted battery pack for supplying power to a motor built in the body of the power tool. The battery pack houses rechargeable lithium cells or other secondary batteries.

The battery pack may be mounted onto the body of the power tool by what will be referred to below as an “insertion method” or a “sliding method.” In the insertion method, the battery pack is mounted on the body of the power tool by inserting an insertion part protruding from the battery pack into a handle part formed on the body of the power tool. In the sliding method, the battery pack is mounted on the power tool by sliding the battery pack onto the lower end of the handle part in a transverse direction, i.e. a direction orthogonal to the longitudinal dimension of the handle part.

DISCLOSURE OF INVENTION

Technical Problem

Having two methods for mounting a battery pack on a power tool is inconvenient because a battery pack using the sliding method cannot be mounted on a power tool employing the insertion method.

Technical Solution

In view of the foregoing, it is an object of the invention to provide an adapter that can be made compact, particularly in the height dimension, and is easy to operate and that enables the use of battery packs employing different mounting methods.

It is another object of the invention to provide an adapter-battery pack assembly, and a power tool employing the adapter described above.

These objects and others will be attained with the adapter that includes:

an insertion part protruding in a first direction and insertable into a body of a power tool, the insertion part having a plurality of terminals for electrically connecting with the power tool;

a pair of rails that guides a battery pack to move in a second direction substantially orthogonal to the first direction for mounting the battery pack;

a tool-latching device for attaching to and detaching from the body of the power tool; and a battery-latching device for attaching to and detaching from the battery pack. The tool-latching device and the battery-latching device are disposed in different positions when viewing the adapter in the first direction.

The adapter-battery pack assembly according to the invention includes an adapter and a battery pack. The adapter includes:

an insertion part protruding in a first direction and insertable into a body of a power tool, the insertion part having a plurality of terminals for electrically connecting with the power tool;

a pair of rails that guides a battery pack to move in a second direction substantially orthogonal to the first direction for mounting the battery pack;

an operating part for attaching the adapter to and detaching the adapter from the body of the power tool; and a receiving part for attaching the adapter to and detaching the adapter from the battery pack.

The battery pack includes:

a battery case accommodating a battery;

a pair of rail grooves formed in the battery case for inserting the pair of rails; and a battery-side operating part engageable with the receiving part. The operating part of the adapter and the receiving part are disposed in different positions when viewing the adapter in the first direction of the insertion part.

A power tool according to the invention includes:

a motor;

a battery pack serving as a power source for the motor;

an accommodating section that opens outward;

an electric connector disposed adjacent the accommodating section; and an adapter that supplies power from the battery pack to the motor, the adapter comprising: an insertion part that is inserted into the accommodating section and has a plurality of terminals for electrically connecting with the power tool; a pair of rails that guides insertion of the battery pack in a direction substantially orthogonal to the insertion direction of the insertion part; an operating part that attaches the insertion part in and detaching the insertion part from the accommodating section; and a receiving part for attaching to and detaching from the battery pack. The operating part and the receiving side are disposed in different positions when viewing the adapter in the insertion direction of the insertion part.

The adapter according to the invention is preferably configured from a base part having a pair of first side walls disposed in substantially confronting relation with each other and a pair of second side walls disposed in substantially confronting relation with each other and connecting the pair of first side walls. The operating part of the adapter serving as a tool-latching device is configured to engage a receiving part provided in the body of the power tool. A receiving part serving as a battery-latching device is configured to engage an operating part provided in the battery pack. The operating part and the receiving part are disposed on different walls of the pair of first side walls and the pair of second side walls.

One operating part of the tool-latching device may be disposed on one of the pair of second side walls, and one receiving part of the battery-latching device may be formed in each of the pair of first side walls.

Alternatively, one receiving part of the battery-latching device may be formed in one of the pair of second side walls, and one operating part of the tool-latching device may be disposed on each of the pair of first side walls.

Preferably, operation of the operating part of the tool-latching device detaches the adapter from the body of the power tool. Similarly, operation of the operating part of the battery pack detaches the adapter from the battery pack.

Advantageous Effects

With the invention described above, the adapter enables the use of battery packs having different mounting methods. Further, since the operating part of the tool-latching device and the receiving part of the battery-latching device are disposed at different positions when viewed along the insertion direction of the insertion part on the adapter, the operating part and the receiving part do not overlap vertically (along the insertion direction of the insertion part), making it possible to reduce the height of the adapter to form a more compact construction and improving the ease of operating the operating parts of the tool-latching device and the battery-latching device, respectively.

EXPLANATION OF REFERENCE

Figure 1:
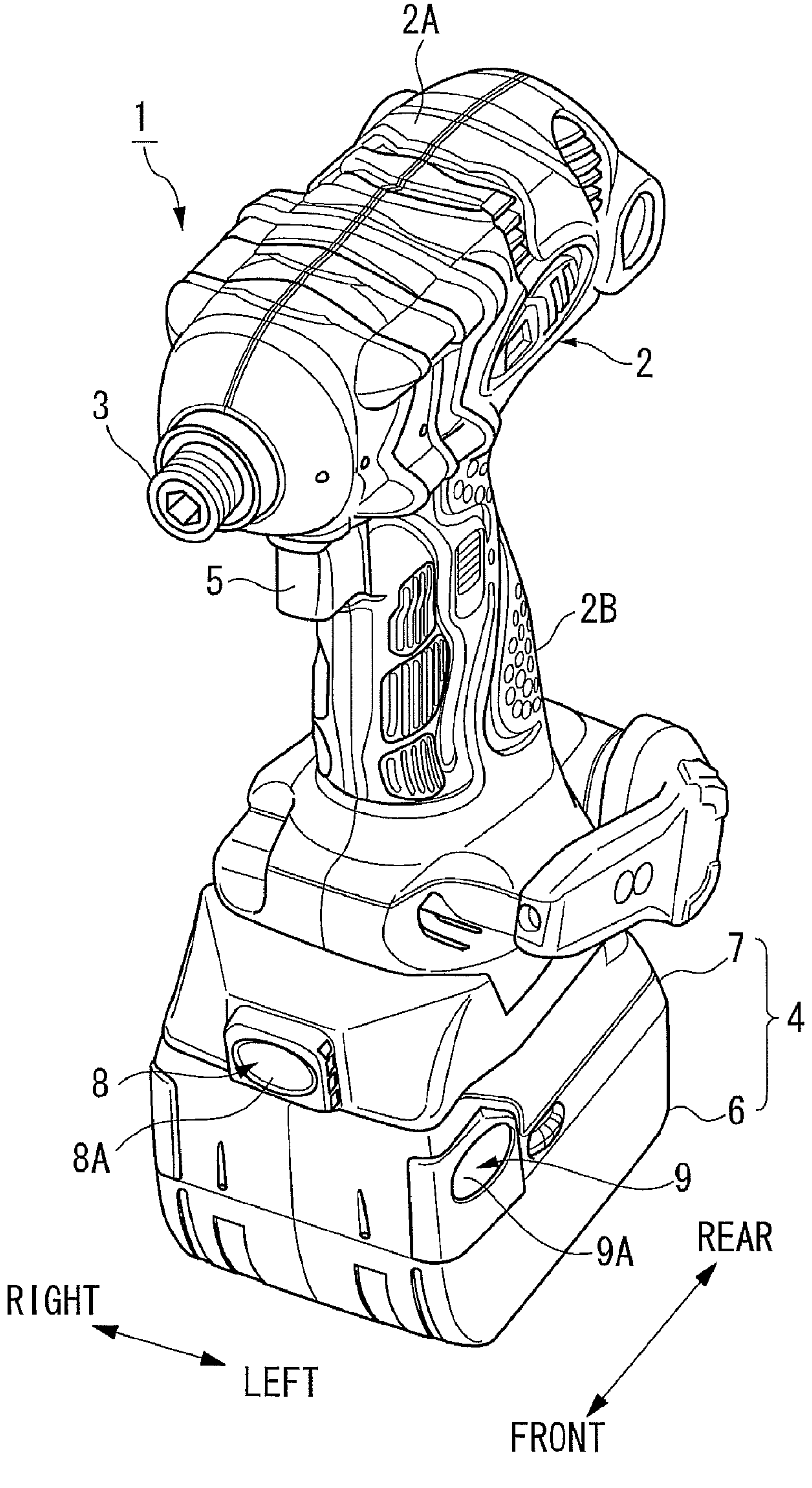
FIG. 1 is a perspective view showing one example a power tool to which the invention is applied.

1 Power tool (power drill)
2 Housing
2A Main body part
2B Handle part
3 Drill chuck
4 Adapter-battery pack assembly
5 Trigger switch
6 Sliding-type battery pack
6A Battery case
6B Connector
6*a* Front wall
6*b* Rear wall
6*c* Left wall
6*d* Right wall
6*e* Terminal insertion part
6*f* Rib
6*g* Engaging groove
7 Adapter
7A Base part
7B Insertion part
7*a* Front wall
7*b* Rear wall
7*c* Left wall
7*d* Right wall
7*e* Rail
7*f* Groove
8 Tool-latching device
8A Operating part
8*a* Pressing part
8*b* Latch pawl
8*c* Spring
8*d* Slider
9 Battery latching device
9A Operating part
9B Receiving part
9*a* pressing part
9*b* Latch pawl
9*c* Spring
10 Terminals

BEST MODE FOR CARRYING OUT THE INVENTION

Next, preferred modes of the invention will be described while referring to the accompanying drawings.

Mode for the Invention 1

First, the first mode of the invention will be described with reference to FIGS. 1 to 9.

FIG. 1 is a perspective view showing a power drill 1 as one example of a power tool to which the invention is applied. The power drill 1 has a housing 2 that is T-shaped in a side view. The housing 2 includes a main body part 2A and a handle part 2B extending substantially at a right angle to the main body part 2A. The main body part 2A accommodates a motor (not shown) serving as a drive source. A drill chuck 3 for holding a tip tool or drill bit (not shown) is rotatably provided on the front side of the main body part 2A. The drill bit is detachably mounted in the drill chuck 3.

An adapter-battery pack assembly 4 is detachably mounted on the lower end of the handle part 2B in FIG. 1. A trigger switch 5 is disposed on the front upper end of the handle part 2B where the handle part 2B connects to the main body part 2A.

Figure 3:
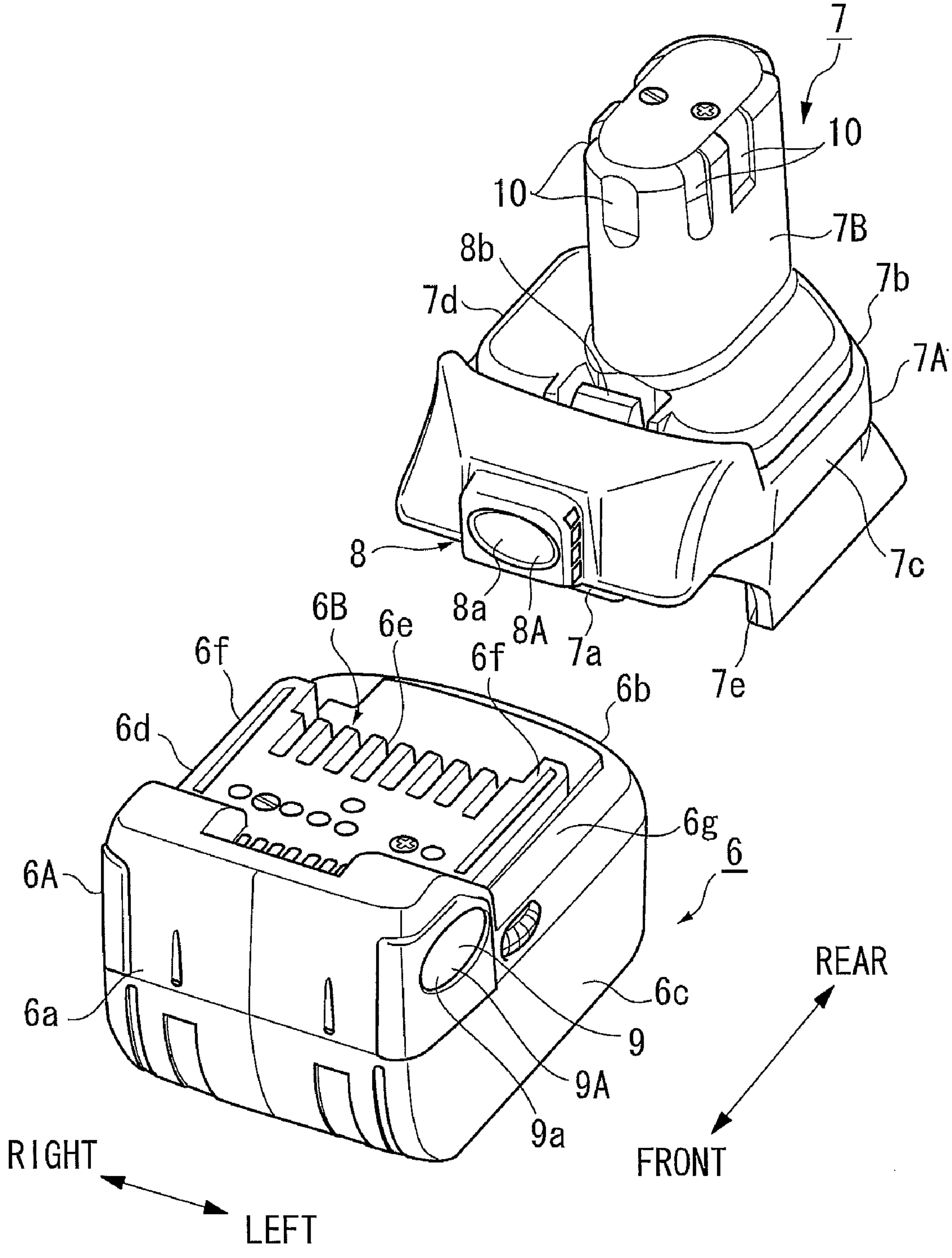
FIG. 3 is an exploded perspective view showing a battery pack with attached adapter according to the first mode of the invention.
Figure 4:
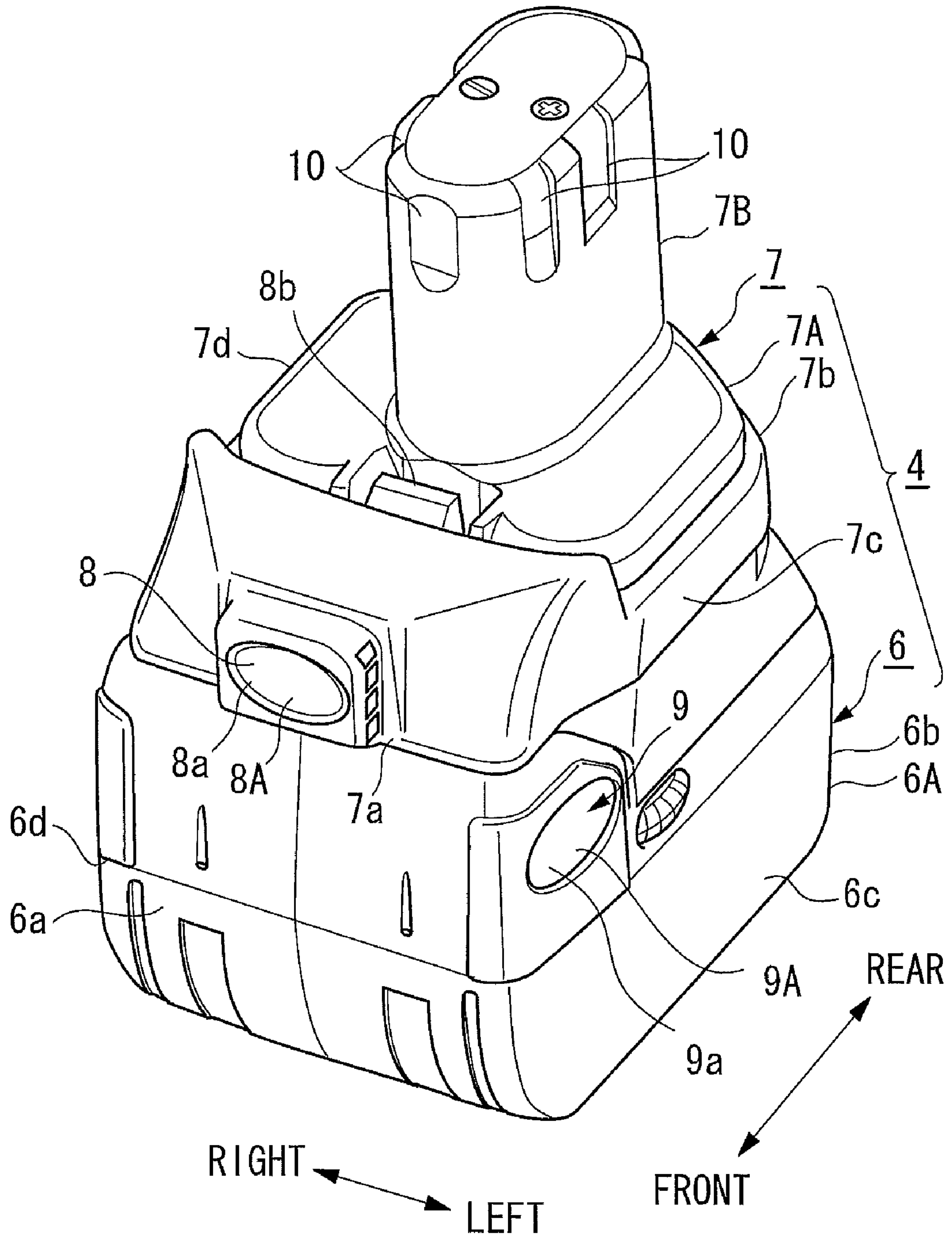
FIG. 4 is a perspective view showing the battery pack with attached adapter according to the first mode of the invention.

FIG. 3 is an exploded perspective view and FIG. 4 is a perspective view both showing the adapter-battery pack assembly 4 according to the first mode of the invention. As is illustrated in FIGS. 3 and 4, the adapter-battery pack assembly 4 is constructed by detachably mounting an adapter 7 on a sliding-type battery pack 6 using the sliding method.

The power drill 1, to which the first mode of the invention is applied, is intended to be used by mounting an insertion type battery pack (not shown) into the lower end of the handle part 2B. Here, an outward-opening accommodating space (not shown) is formed in the lower end of the handle part 2B. Although not shown in the drawings, an electrical connector having a plurality of terminals is provided in the back inside part of the accommodating space.

To operate the power drill 1 powered by an insertion-type battery pack (not shown) with the sliding-type battery pack 6, the adapter 7 is used to mount the battery pack 6 in the power drill 1. To do this, the adapter 7 is first mounted on the handle part 2B of the power drill 1, and the battery pack 6 is subsequently mounted on the adapter 7 according to the sliding method. Alternatively, the adapter-battery pack assembly 4 may be constructed by mounting the adapter 7 on the battery pack 6, as shown in FIG. 4 and subsequently mounted on the handle part 2B of the power drill 1 according to the insertion method.

As shown in FIG. 1, a tool-latching device 8 is used to mount the adapter 7 or the adapter-battery pack assembly 4 on the handle part 2B of the power drill 1, and a battery-latching device 9 is used to mount the adapter 7 on the battery pack 6.

Next, the structure of the adapter 7 will be described.

Integrally molded of resin, the adapter 7 includes a base part 7A having a substantially rectangular parallelepiped shape, and an insertion part 7B having an elliptical cylinder shape that protrudes from the top surface of the base part 7A in the rear portion thereof. The insertion part 7B is inserted from the lower end of the handle part 2B of the power drill 1 into the accommodating space (not shown) formed in the handle part 2B. The insertion part 7B accommodates a circuit board (not shown) in a vertical orientation. Terminals 10 leading to the circuit board are exposed around the top outer periphery of the insertion part 7B. When the insertion part 7B is inserted into the accommodating space in the handle part 2B, the terminals 10 connect with the terminals on the electrical connector provided in the back of the accommodating space.

Figure 2:
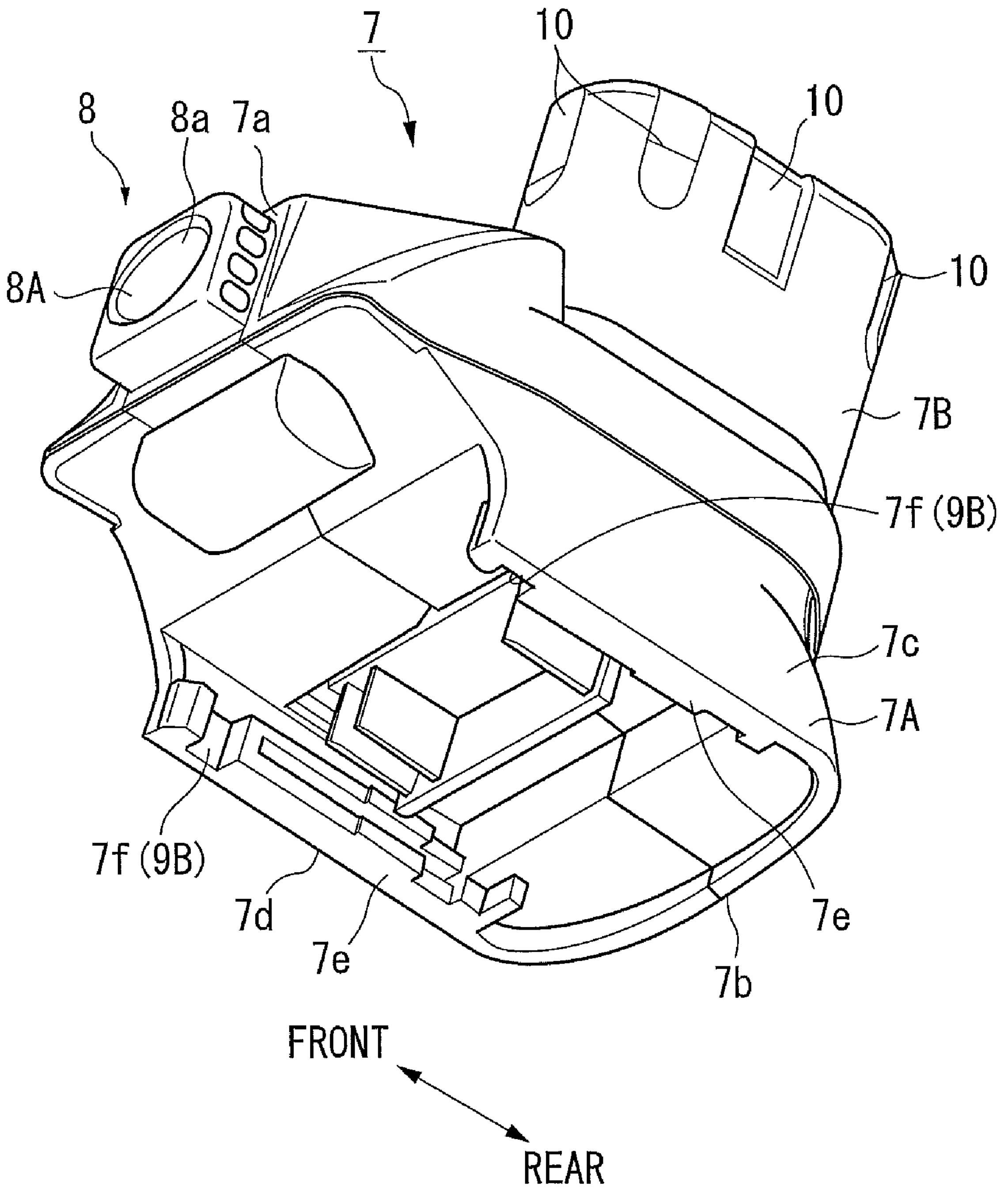
FIG. 2 is a perspective view showing an adapter according to a first mode of the invention from a position obliquely beneath the adapter.

The outer periphery of the base part 7A on the adapter 7 is formed of first side walls and second side walls. The first side walls include a front wall 7*a* and a rear wall 7*b* disposed in substantially confronting relation with each other. The second side walls include a left wall 7*c* and a right wall 7*d* disposed in substantially confronting relation with each other. The left wall 7*c* and the right wall 7*d*, i.e., the second side walls, connect the front wall 7*a* and rear wall 7*b*, i.e., the first side walls. As shown in FIG. 2, a depression is formed in the bottom surface of the base part 7A, and a pair of rails 7*e* extends parallel to each other in the front-to-rear direction along the bottoms of the left and right walls 7*c* and 7*d*. The left and right rails 7*e* function both to guide the battery pack 6 when the battery pack 6 is mounted on the adapter 7 according to the sliding method and to engage the battery pack 6 so as to prevent the battery pack 6 from coming off the adapter 7.

The tool-latching device 8 has an operating part 8A provided on the adapter 7, while the battery-latching device 9 has a pair of receiving parts 9B also provided on the adapter 7. The operating part 8A of the tool-latching device 8 and the receiving parts 9B of the battery-latching devices 9 are disposed at different positions on the adapter 7 when viewed along the insertion direction for inserting the adapter 7 into the handle part 2B of the power drill 1 (plan view).

Figure 7:
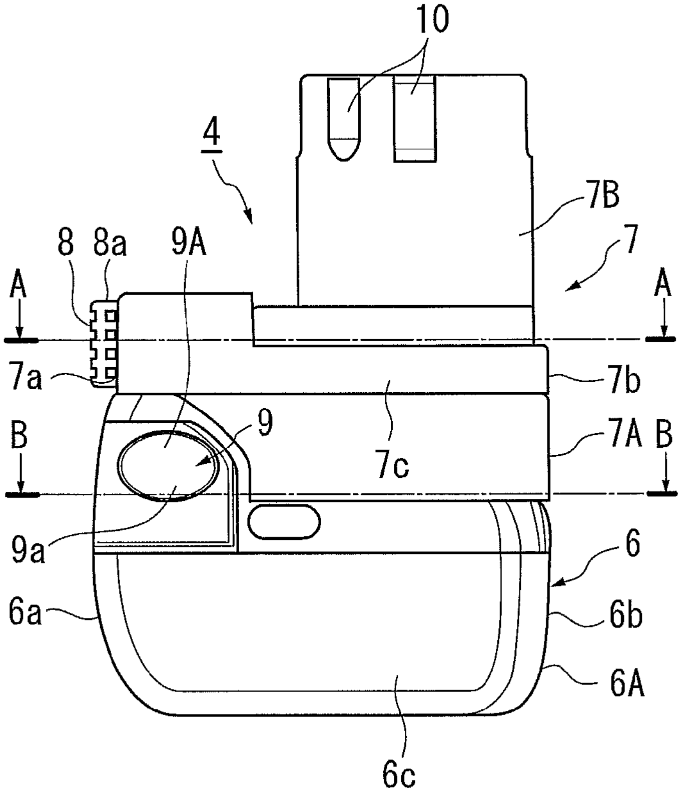
FIG. 7 is a side view showing the battery pack with attached adapter according to the first mode of the invention.
Figure 8:
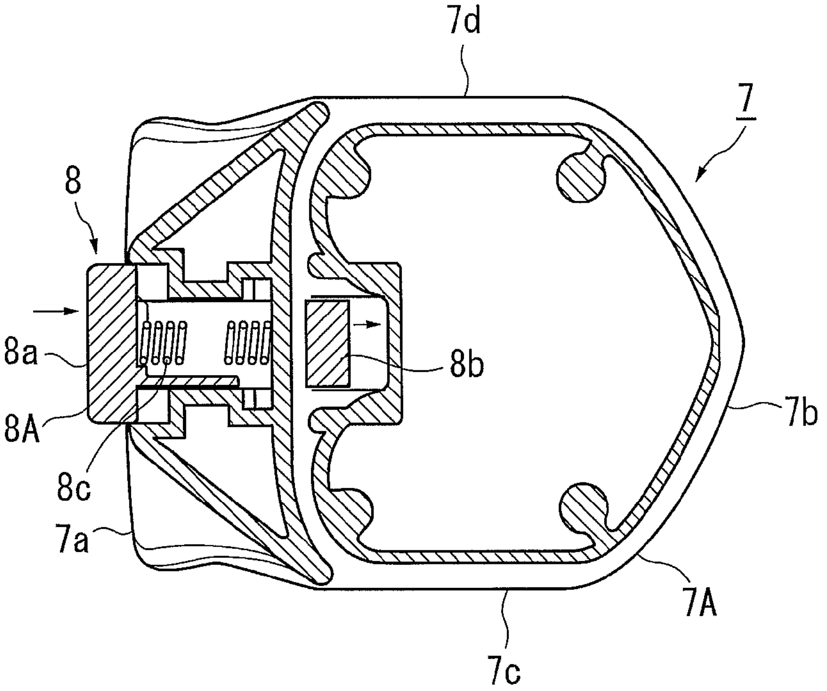
FIG. 8 is a cross-sectional view showing the adapter taken along the line A-A in FIG. 7.

More specifically, the operating part 8A of the tool-latching device 8 is disposed on the front wall 7*a* of the base part 7A. FIG. 7 is a side view showing the adapter-battery pack assembly 4, and FIG. 8 is a cross-sectional view of the adapter-battery pack assembly 4 taken along the line A-A in FIG. 7. As shown in FIG. 8, the operating part 8A includes a pressing part 8*a* capable of sliding in the front-to-rear direction as indicated by an arrow, a latch pawl 8*b* erected vertically from the rear end of the pressing part 8*a*, and a spring 8*c* for urging the pressing part 8*a* and the latch pawl 8*b* forward (leftward in FIG. 8).

A total of two receiving parts 9B of the battery-latching device 9 are provided, with one each extending along the left and right walls 7*c* and 7*d* of the base part 7A. As shown in FIG. 2, the receiving parts 9B are formed from rectangular engaging grooves 7*f* formed in the inner sides of the rails 7*e* near the front ends thereof on the bottom surface of the base part 7A.

Next, the structure of the battery pack 6 will be described in detail.

As best shown in FIG. 3, the battery pack 6 has a battery case 6A molded of resin substantially in a rectangular parallelepiped shape. The battery pack 6 accommodates a plurality of rechargeable battery cells (not shown), such as lithium ion cells. On the outer periphery of the battery case 6A are formed a front wall 6*a*, a rear wall 6*b*, a left wall 6*c* and a right wall 6*d*. The left wall 6*c* and the right wall 6*d* connect the front wall 6*a* and rear wall 6*b*.

Figure 9:
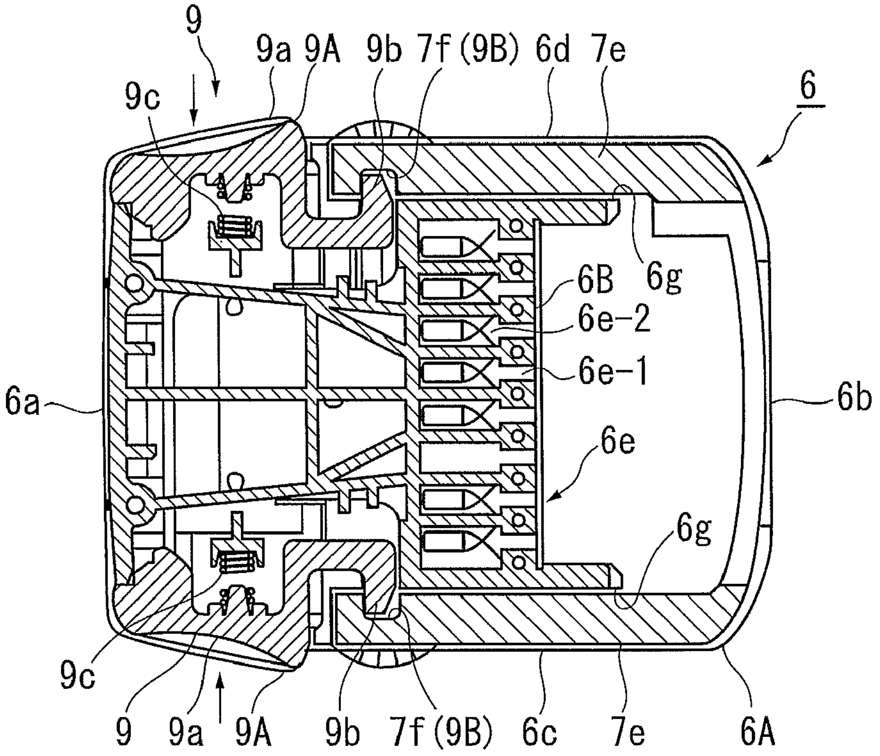
FIG. 9 is a cross-sectional view showing the adapter taken along the line B-B in FIG. 7.

A connector 6B is provided on the top surface of the battery case 6A. Referring to FIG. 3 and FIG. 9 that is a cross-sectional view of the adapter taken along the line B-B in FIG. 7, the connector 6B includes a terminal insertion part 6*e*, and a pair of left and right ribs 6*f*. The terminal insertion part 6*e* is provided with a plurality of slots 6*e*-1 opening rearward (rightward in FIG. 9), each of which accommodates a terminal 6*e*-2. The left and right ribs 6*f* extend parallel to each other in the front-to-rear direction along the left wall 6*c* and right wall 6*d* of the battery case 6A. Engaging grooves 6*g* having a rectangular cross section are formed parallel to each other along the front-to-rear direction between the top surface of the battery case 6A and the left and right ribs 6*f*.

The battery-latching device 9 has a total of two operating parts 9A provided on the battery pack 6, with one each on the left and right walls 6*c* and 6*d* of the battery case 6A. As shown in FIG. 9, each of the operating parts 9A includes a pressing part 9*a* operated by pushing in a transverse direction, indicated by an arrow in FIG. 9, a latch pawl 9*b* having a hook-shape extending from the pressing part 9*a* that is bent to form three sides of a rectangle in a plan view, and a spring 9*c* for urging the pressing part 9*a* outward. The latch pawl 9*b* protrudes into the respective engaging groove 6*g* of the battery pack 6 while the pressing part 9*a* is not being pressed and is retracted from the engaging groove 6*g* when the pressing part 9*a* is pressed.

Figure 5:
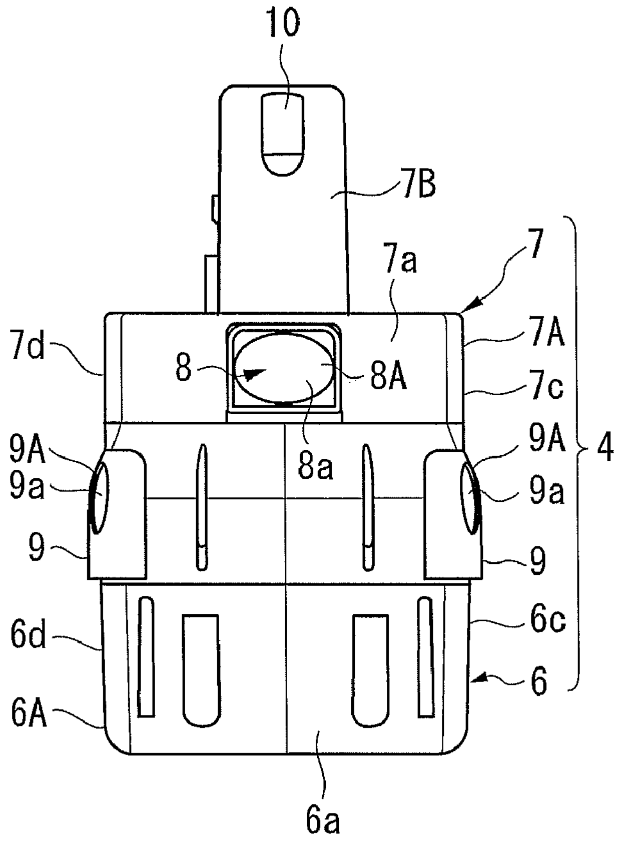
FIG. 5 is a front view showing the battery pack with attached adapter according to the first mode of the invention.
Figure 6:
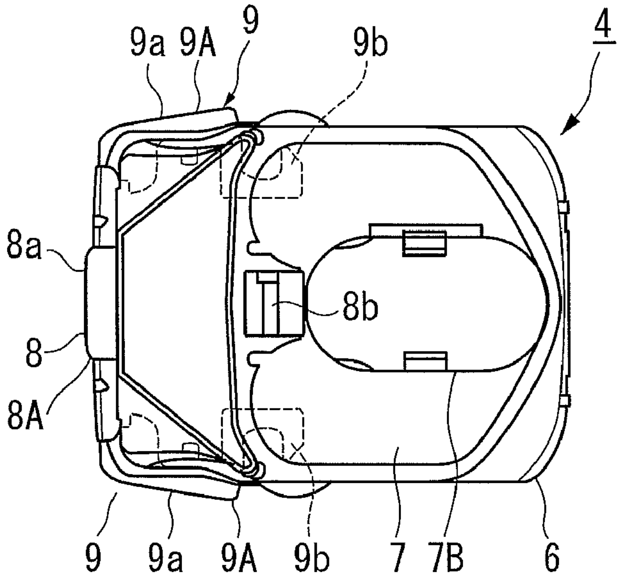
FIG. 6 is a plan view showing the battery pack with attached adapter according to the first mode of the invention.

The adapter 7 is coupled with the battery pack 6 by fitting the rails 7*e* of the adapter 7 into the engaging grooves 6*g* of the battery pack 6 from the rear side, sliding the adapter 7 forward in this state, and engaging the rails 7*e* in the engaging grooves 6*g*. As shown in FIG. 9, the latch pawls 9*b* have tapered surfaces so that when the front ends of the rails 7*e* contact the latch pawls 9*b* and slide over the tapered surfaces formed on the latch pawls 9*b*, the latch pawls 9*b* retract inward, allowing the adapter 7 to slide forward. When the engaging grooves 7*f* formed in the rails 7*e* become aligned with the latch pawls 9*b* on the battery pack 6 side, the restoring force in the latch pawls 9*b* push the latch pawls 9*b* back outward so that the latch pawls 9*b* engage in the engaging grooves 7*f*. In this way, the adapter 7 is reliably mounted on the battery pack 6, completing assembly of the adapter-battery pack assembly 4 shown in FIG. 4. FIG. 5 is a front view, FIG. 6 is a plan view, and FIG. 7 is a side view of the adapter-battery pack assembly 4 shown in FIG. 4.

After mounting the adapter 7 on the battery pack 6 to assemble the adapter-battery pack assembly 4, as described above, the adapter-battery pack assembly 4 is mounted on the bottom end of the handle part 2B by inserting the insertion part 7B on the top side of the adapter 7 into the accommodating space formed in the bottom of the handle part 2B. At this time, the latch pawl 8*b* on the operating part 8A of the tool-latching device 8 provided on the adapter 7 engages in an engaging groove (not shown) on the power drill 1 side to prevent the adapter-battery pack assembly 4 from coming off the power drill 1. Further, the terminals 10 provided around the insertion part 7B of the adapter 7 are connected to the plurality of terminals on the electrical connector (not shown) provided in the accommodating space of the handle part 2B, enabling the battery pack 6 to supply power to the power drill 1.

The power drill 1 is turned on by operating the trigger switch 5 provided thereon, at which time the battery pack 6 supplies power to the motor (not shown) for driving the same. The rotation of the motor is transmitted to the drill chuck 3 via a transmitting mechanism (not shown), driving the drill chuck 3 and a drill bit (not shown) mounted in the drill chuck 3 to rotate for driving a screw.

The adapter-battery pack assembly 4 can be removed from the power drill 1 simply by pressing the pressing part 8*a* of the operating part 8A against the urging force of the spring 8*c* rearward, as indicated by the arrow in FIG. 8. Since the latch pawl 8*b* moves together with the pressing part 8*a* in the same direction at this time, the latch pawl 8*b* disengages from the engaging groove (not shown) on the power drill 1 side, allowing the adapter-battery pack assembly 4 to be removed from the power drill 1. Since the operating part 8A of the tool-latching device 8 provided on the adapter 7 is disposed in a different position from the operating parts 9A of the battery-latching devices 9 provided on the battery pack 6 when viewing the adapter 7 along the direction for inserting the adapter-battery pack assembly 4 into the power drill 1, the operating part 8A and operating parts 9A can be made large to ensure that they are easy to operate. Further, this arrangement reduces the likelihood of the operating parts 9A on the battery-latching devices 9 being operated accidentally.

Further, in the adapter-battery pack assembly 4 described above, the adapter 7 can be removed from the battery pack 6 simply by pressing the operating parts 9*a* of the operating parts 9A inward against the urging force of the springs 9*c*, as indicated by the arrows in FIG. 9. Since the latch pawls 9*b* move together with the respective operating parts 9*a* in the same direction at this time, the latch pawls 9*b* disengage from the engaging grooves 7*f* on the adapter 7 side, enabling the adapter 7 to be removed from the battery pack 6. When removing the adapter-battery pack assembly 4 from the power drill 1, the configuration of the power drill 1 makes it less likely for the operating part 8A of the tool-latching device 8 to be operated accidentally.

Another method of using the power drill 1 is to first mount the adapter 7 on the handle part 2B of the power drill 1 and subsequently mount the battery pack 6 on the adapter 7. However, the steps for mounting the adapter 7 in the power drill 1 and the battery pack 6 on the adapter 7 and the steps for removing the adapter-battery pack assembly 4 from the power drill 1 are essentially identical to those described above.

With the structure according to the first mode of the invention described above, battery packs 6 using different mounting systems can be mounted on the same power drill 1 via the adapter 7. Accordingly, the structure of the first mode of the invention can easily support different mounting methods.

Further, by disposing the operating part 8A of the tool-latching device 8 in a different position from the operating parts 9A of the battery-latching devices 9 when viewed along the direction in which the insertion part 7B of the adapter 7 is inserted, the structure according to the first mode of the invention reduces the likelihood of a user operating the wrong operating part, thereby achieving high operability for the operating part 8A and operating parts 9A.

Mode for the Invention 2

Next, a second mode of the invention will be described with reference to FIGS. 10 through 13, wherein like parts and components are designated with the same reference numerals to avoid duplicating description.

Figure 10:
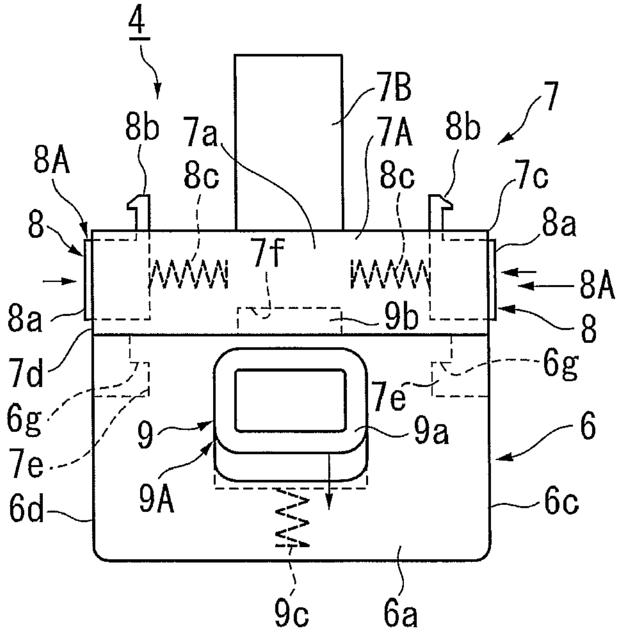
FIG. 10 is a front view showing a battery pack with an attached adapter according to a second mode of the invention.
Figure 11:
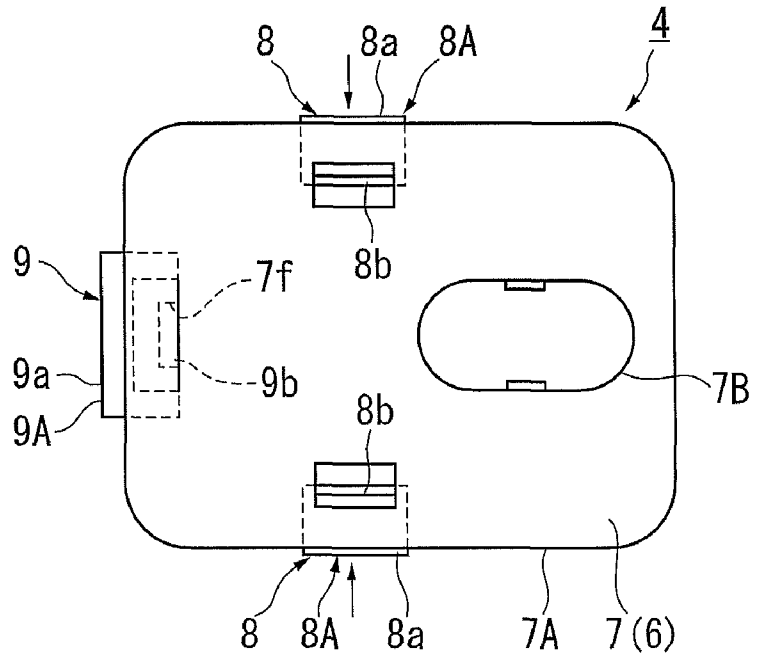
FIG. 11 is a plan view showing a battery pack with an attached adapter according to the second mode of the invention.
Figure 12:
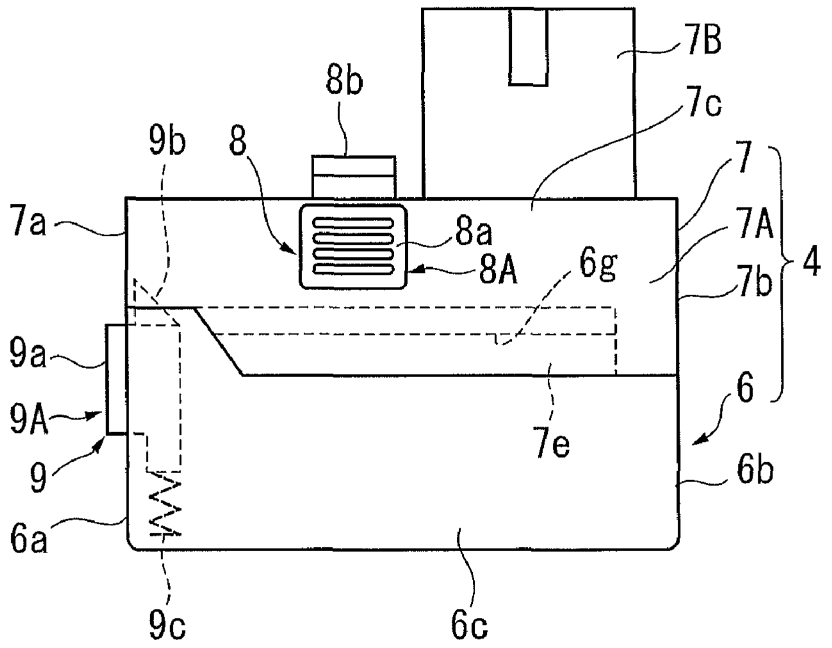
FIG. 12 is a side view showing a battery pack with an attached adapter according to the second mode of the invention.
Figure 13:
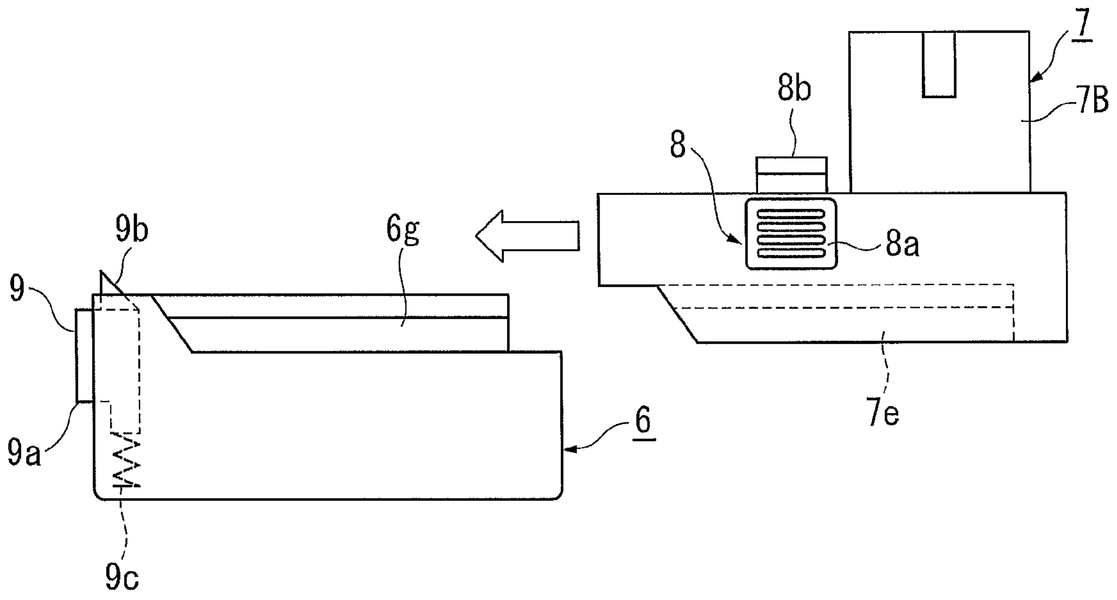
FIG. 13 is a side view illustrating a method of mounting the adapter on the battery pack according to the second mode of the invention.

FIG. 10 is a front view, FIG. 11 is a plan view, and FIG. 12 is a side view of a battery pack with an attached adapter according to a second mode of the invention. FIG. 13 is a side view illustrating a method of mounting the adapter on the battery pack.

In the second mode of the invention, operating parts 8A of two tool-latching devices 8 and a receiving part 9B of one battery-latching device 9 are provided on the adapter 7 and are disposed in different positions when viewing the adapter 7 in a plan view, i.e. along the direction in which the adapter 7 is inserted into the power drill 1.

More specifically, as shown in FIGS. 10 and 11, the operating parts 8A of the tool-latching devices 8 are provided on the base part 7A of the adapter 7, one on each of the left and right walls 7*c* and 7*d*. Each of the operating parts 8A includes a pressing part 8*a* capable of sliding in a transverse direction, a latch pawl 8*b* erected vertically from an inner end of the pressing part 8*a*, and a spring 8*c* for urging the pressing part 8*a* and the latch pawl 8*b* outward (leftward and rightward, respectively, in FIG. 10).

The receiving part 9B of the battery-latching device 9 is disposed on the front wall 7*a* of the base part 7A and is configured of a rectangular engaging groove 7*f* formed in the bottom surface of the base part 7A at the front end thereof.

The operating part 9A of the battery-latching device 9 is provided on the front wall 6*a* of the battery pack 6. The operating part 9A includes a pressing part 9*a* operated by pushing downward, as indicated by the arrow in FIG. 10, a latch pawl 9*b* having a hook shape extending vertically from the top endface of the pressing part 9*a*, and a spring 9*c* for urging the pressing part 9*a* upward.

The adapter 7 is coupled with the battery pack 6 by fitting the rails 7*e* of the adapter 7 into the engaging grooves 6*g* of the battery pack 6 from the rear side, sliding the adapter 7 forward in this state, as indicated by the arrow in FIG. 13, and engaging the rails 7*e* in the engaging grooves 6*g*. As shown in FIG. 12, the latch pawl 9*b* has a tapered surface so that when the front end of the adapter 7 contacts the latch pawl 9*b* and slides over the tapered surface formed on the latch pawl 9*b*, the latch pawl 9*b* moves downward against the urging force of the spring 9*c*, allowing the adapter 7 to slide forward. When the engaging groove 7*f* formed in the adapter 7 becomes aligned with the latch pawl 9*b* on the battery pack 6 side, the urging force of the spring 9*c* pushes the latch pawl 9*b* upward so that the latch pawl 9*b* engages in the engaging groove 7*f*. In this way, the adapter 7 is reliably mounted on the battery pack 6, completing assembly of the adapter-battery pack assembly 4 shown in FIGS. 10 through 12.

After mounting the adapter 7 on the battery pack 6 to assemble the adapter-battery pack assembly 4, as described above, the adapter-battery pack assembly 4 is mounted on the bottom end of the handle part 2B by inserting the insertion part 7B on the top side of the adapter 7 into the accommodating space formed in the bottom of the handle part 2B. At this time, the latch pawls 8*b* on the operating parts 8A of the left and right tool-latching devices 8 provided on the adapter 7 engage in engaging grooves (not shown) on the power drill 1 side to prevent the adapter-battery pack assembly 4 from coming off the power drill 1 and enable the battery pack 6 to supply power to the power drill 1.

The adapter-battery pack assembly 4 can be removed from the power drill 1 simply by pressing the operating parts 8*a* of the operating parts 8A inward against the urging force of the springs 8*c*, as indicated by the arrows in FIG. 11. Since the latch pawls 8*b* move together with the operating parts 8*a* in the same direction at this time, the latch pawls 8*b* disengage from the engaging grooves (not shown) on the power drill 1 side, allowing the adapter-battery pack assembly 4 to be removed from the power drill 1. Since the operating parts 8A of the tool-latching devices 8 provided on the adapter 7 are disposed in different positions from the operating part 9A of the battery-latching device 9 provided on the battery pack 6 when viewing the adapter 7 along the direction for inserting the adapter-battery pack assembly 4 into the power drill 1, the operating parts 8A and operating part 9A can be made large to ensure that they are easy to operate. Further, this arrangement reduces the likelihood of the operating part 9A on the battery-latching device 9 being operated accidentally.

Further, the adapter 7 can be removed from the adapter-battery pack assembly 4 simply by pressing the pressing part 9*a* of the operating part 9A downward against the urging force of the spring 9*c*, as indicated by the arrow in FIG. 10. Since the latch pawl 9*b* moves together with the pressing part 9*a* in the same direction at this time, the latch pawl 9*b* disengages from the engaging groove 7*f* on the adapter 7 side, enabling the adapter 7 to be removed from the battery pack 6. When removing the adapter-battery pack assembly 4 from the power drill 1, the configuration of the power drill 1 makes it less likely for the operating parts 8A of the tool-latching devices 8 to be operated accidentally.

In the second mode of the invention described above, battery packs 6 using different mounting systems can be mounted on the same power drill 1 via the adapter 7. Accordingly, the structure of the preferred mode of the invention can easily support different mounting methods.

Further, by disposing the operating parts 8A of the tool-latching devices 8 in different position from the operating part 9A of the battery-latching device 9 when viewed along the direction in which the insertion part 7B of the adapter 7 is inserted, the structure according to the second mode of the invention reduces the likelihood of a user operating the wrong operating part, thereby achieving high operability for the operating parts 8A and operating part 9A.

Mode for the Invention 3

Next, a third mode of the invention will be described with reference to FIGS. 14 through 17, wherein like parts and components are designated with the same reference numerals to avoid duplicating description.

Figure 14:
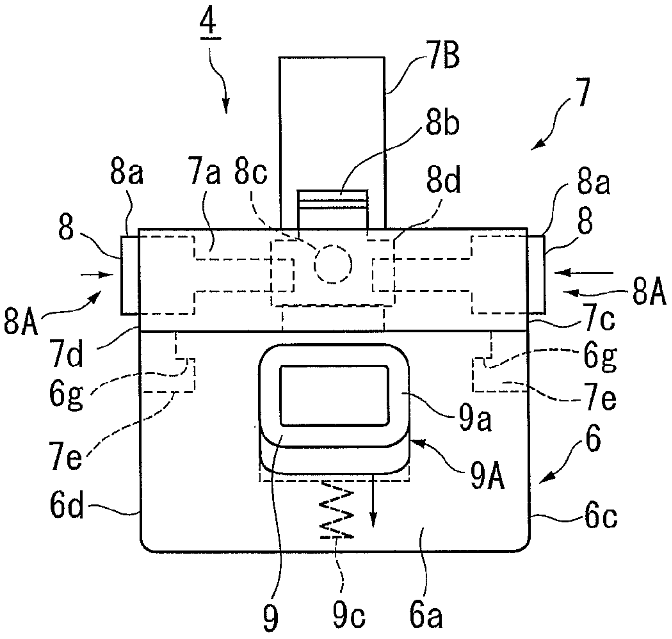
FIG. 14 is a front view showing a battery pack with an attached adapter according to a third mode of the invention.
Figure 15:
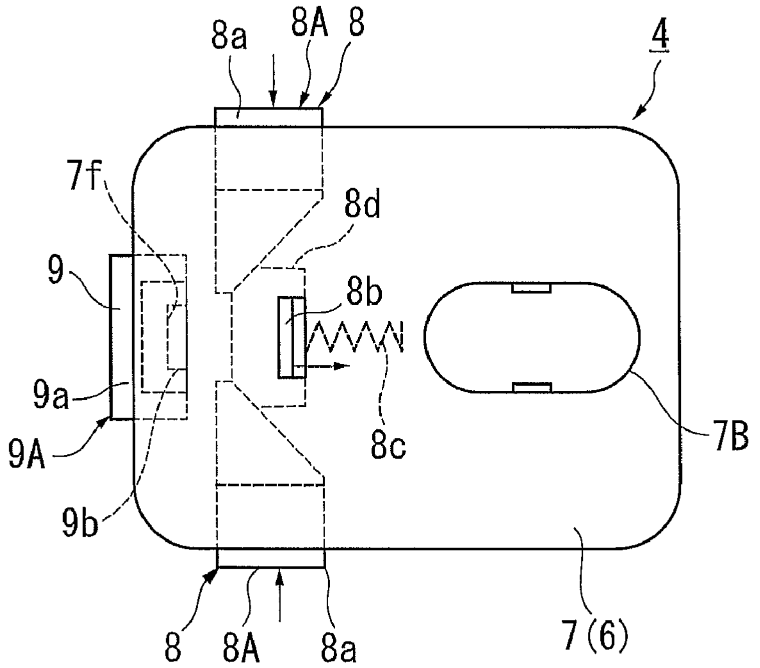
FIG. 15 is a plan view showing a battery pack with an attached adapter according to the third mode of the invention.
Figure 16:
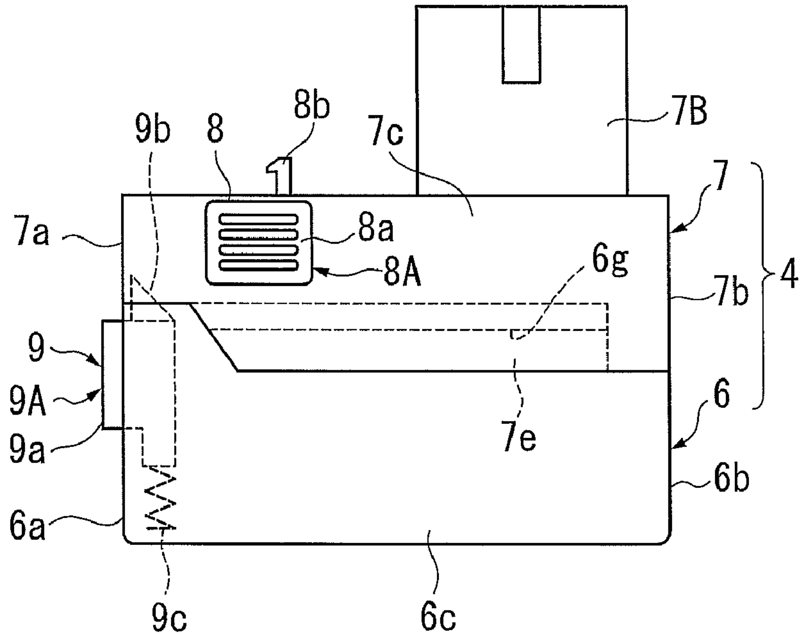
FIG. 16 is a side view showing a battery pack with an attached adapter according to the third mode of the invention.
Figure 17:
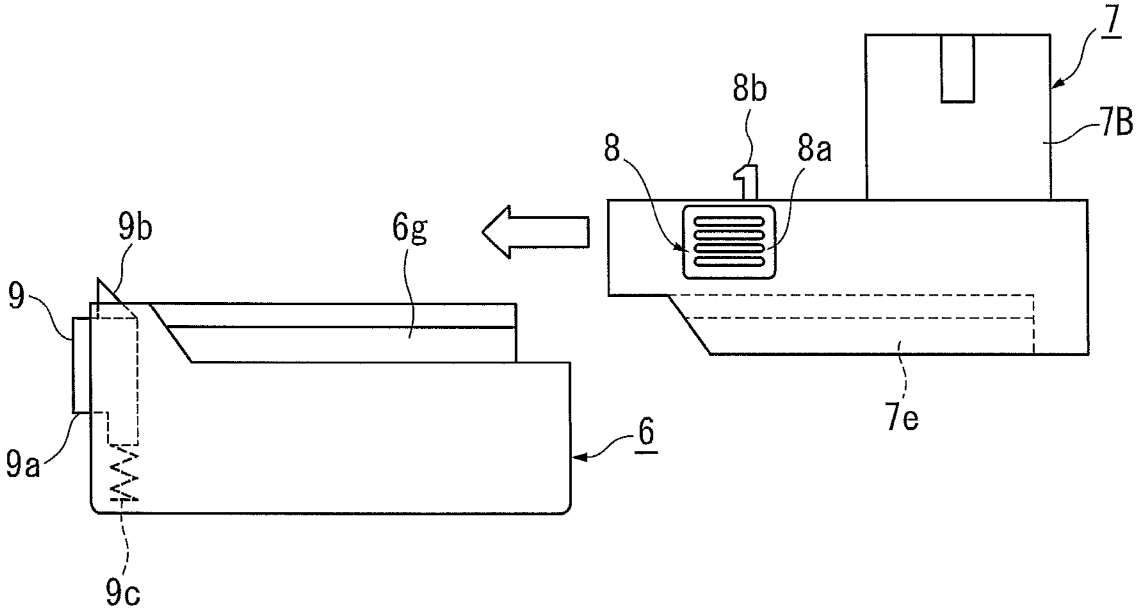
FIG. 17 is a side view illustrating a method of mounting the adapter on the battery pack according to the third mode of the invention.

FIG. 14 is a front view, FIG. 15 is a plan view, and FIG. 16 is a side view of a battery pack with an attached adapter according to the third mode of the invention. FIG. 17 is a side view illustrating a method of mounting the adapter on the battery pack according to the third mode of the invention.

In the third mode of the invention, operating parts 8A of two tool-latching devices 8 and a receiving part 9B of one battery-latching device 9 are provided on the adapter 7 and are disposed in different positions when viewing the adapter 7 in a plan view, i.e. along the direction in which the adapter 7 is inserted into the power drill 1.

More specifically, as shown in FIG. 15, the operating parts 8A of the tool-latching devices 8 are provided on the base part 7A of the adapter 7, one on each of the left and right walls 7*c* and 7*d*. Each of the operating parts 8A includes a pressing part 8*a* capable of sliding in a transverse direction and having a tapered surface on the inner endface. The two operating parts 8A share a slider 8*d* that contacts the tapered surfaces of both operating parts 8*a* and is capable of sliding forward and rearward, a latch pawl 8*b* erected vertically from a rear end of the slider 8*d*, and a spring 8*c* for urging the slider 8*d* and the latch pawl 8*b* forward (leftward in FIG. 15).

As in the second mode of the invention, the receiving part 9B of the battery-latching device 9 is disposed on the front wall 7*a* of the base part 7A and is configured of a rectangular engaging groove 7*f* formed in the bottom surface of the base part 7A at the front end thereof.

As in the second mode of the invention, the operating part 9A of the battery-latching device 9 is provided on the front wall 6*a* of the battery pack 6. The operating part 9A includes a pressing part 9*a* operated by pushing downward, as indicated by the arrow in FIG. 14, a latch pawl 9*b* having a hook shape extending vertically from the top endface of the pressing part 9*a*, and a spring 9*c* for urging the pressing part 9*a* and latch pawl 9*b* upward.

The adapter 7 is coupled with the battery pack 6 by fitting the left and right rails 7*e* into the left and right engaging grooves 6*g* of the battery pack 6 from the rear side, sliding the adapter 7 forward in this state, as indicated by the arrow in FIG. 17, and engaging the rails 7*e* in the engaging grooves 6*g*. As shown in FIG. 16, the latch pawl 9*b* has a tapered surface so that when the front end of the adapter 7 contacts the latch pawl 9*b* and slides over the tapered surface formed on the latch pawl 9*b*, the latch pawl 9*b* moves downward against the urging force of the spring 9*c*, allowing the adapter 7 to slide forward. When the engaging groove 7*f* formed in the adapter 7 becomes aligned with the latch pawl 9*b* on the battery pack 6 side, the urging force of the spring 9*c* pushes the latch pawl 9*b* upward so that the latch pawl 9*b* engages in the engaging groove 7*f*. In this way, the adapter 7 is reliably mounted on the battery pack 6, completing assembly of the adapter-battery pack assembly 4 shown in FIGS. 14 through 16.

After mounting the adapter 7 on the battery pack 6 to assemble the adapter-battery pack assembly 4, as described above, the adapter-battery pack assembly 4 is mounted on the bottom end of the handle part 2B by inserting the insertion part 7B on the top side of the adapter 7 into the accommodating space formed in the bottom of the handle part 2B. At this time, the latch pawl 8*b* of the operating parts 8A engage in an engaging groove (not shown) formed in the power drill 1 side to prevent the adapter-battery pack assembly 4 from coming off the power drill 1 and to enable the battery pack 6 to supply power to the power drill 1.

The adapter-battery pack assembly 4 can be removed from the power drill 1 simply by pressing the operating parts 8*a* of the operating parts 8A inward against the urging force of the spring 8*c*, as indicated by the arrows in FIG. 15. Since the slider 8*d* contacting the tapered surfaces of the operating parts 8*a* slides rearward (rightward in FIG. 15) against the urging force of the spring 8*c* at this time due to the wedge effect, the latch pawl 8*b* formed integrally with the slider 8*d* moves in the same direction. Accordingly, latch pawl 8*b* disengages from the engaging groove (not shown) on the power drill 1 side, allowing the adapter-battery pack assembly 4 to be removed from the power drill 1. Since the operating parts 8A of the tool-latching devices 8 provided on the adapter 7 are disposed in different positions from the operating part 9A of the battery-latching device 9 provided on the battery pack 6 when viewing the adapter 7 along the direction for inserting the adapter-battery pack assembly 4 into the power drill 1, the operating parts 8A and operating part 9A can be made large to ensure that they are easy to operate. Further, this arrangement reduces the likelihood of the operating part 9A on the battery-latching device 9 being operated accidentally.

Further, as in the second mode of the invention described above, the adapter 7 can be removed from the adapter-battery pack assembly 4 simply by pressing the pressing part 9*a* of the operating part 9A downward against the urging force of the spring 9*c*, as indicated by the arrow in FIG. 14. Since the latch pawl 9*b* moves together with the pressing part 9*a* in the same direction at this time, the latch pawl 9*b* disengages from the engaging groove 7*f* on the adapter 7 side, enabling the adapter 7 to be removed from the battery pack 6. When removing the adapter-battery pack assembly 4 from the power drill 1, the configuration of the power drill 1 makes it less likely for the operating parts 8A of the tool-latching devices 8 to be operated accidentally.

In the third mode of the invention described above, battery packs 6 using different mounting systems can be mounted on the same power drill 1 via the adapter 7. Accordingly, the structure of the third mode of the invention can easily support different mounting methods.

Further, by disposing the operating parts 8A of the tool-latching devices 8 in different position from the operating part 9A of the battery-latching device 9 when viewed along the direction in which the insertion part 7B of the adapter 7 is inserted, the structure according to the third mode of the invention reduces the likelihood of a user operating the wrong operating part, thereby achieving high operability for the operating parts 8A and operating part 9A.

Industrial Applicability

An adapter of the invention can be used in conjunction with a cordless power tool and enables the cordless power tool to use battery packs of different mounting type.

The invention claimed is:

1. An adapter configured for mounting a battery to a power tool, comprising:
- an insertion part protruding in a first direction and insertable into a body of a power tool, the insertion part having a plurality of terminals for electrically connecting with the power tool;
- a pair of rails that guides a battery pack to move in a second direction substantially orthogonal to the first direction for mounting the battery pack;
- a tool-latching device for attaching to and detaching from the body of the power tool; and
- a battery-latching device for attaching to and detaching from the battery pack,
- wherein the tool-latching device and the battery-latching device are disposed in different positions when viewing the adapter in the first direction.

2. The adapter according to claim 1, further comprising a base part having a pair of first side walls disposed in substantially confronting relation with each other and a pair of second side walls disposed in substantially confronting relation with each other and connecting the pair of first side walls, wherein the tool-latching device comprises an operating part capable of engaging a receiving part provided in the body of the power tool, and the battery-latching device comprises a receiving part with which an operating part provided in the battery pack is engageable, the operating part of the tool-latching device being disposed on a different wall of the pair of first side walls and the pair of second side walls than the receiving part of the battery-latching device.

3. The adapter according to claim 2, wherein the operating part of the tool-latching device is disposed on at least one of the pair of second side walls, and the receiving part of the battery-latching device is formed in the pair of first side walls.

4. The adapter according to claim 2, wherein the receiving part of the battery-latching device is formed in the pair of second side walls, and the operating part of the tool-latching device is disposed on the pair of first side walls.

5. The adapter according to claim 2, wherein operation of the operating part of the tool-latching device detaches the adapter from the body of the power tool.

6. The adapter according to claim 2, wherein operation of the operating part of the battery pack detaches the adapter from the battery pack.

7. An adapter-battery pack assembly comprising an adapter and a battery pack,
- wherein the adapter is configured to mount the battery pack to a power tool and comprises:
- an insertion part protruding in a first direction and insertable into a body of the power tool, the insertion part having a plurality of terminals for electrically connecting with the power tool;
- a pair of rails that guides a battery pack to move in a second direction substantially orthogonal to the first direction for mounting the battery pack;
- a tool-latching device including an operating part for attaching the adapter to and detaching the adapter from the body of the power tool; and
- a receiving part for attaching the adapter to and detaching the adapter from the battery pack,
- wherein the battery pack comprises:
- a battery case accommodating a battery;
- a pair of rail grooves formed in the battery case for inserting the pair of rails; and
- a battery-side operating part engageable with the receiving part,
- wherein the operating part of the adapter and the receiving part are disposed in different positions when viewing the adapter in the first direction of the insertion part.

8. The adapter-battery pack assembly according to claim 7, wherein the adapter further comprises a base part having a pair of first side walls disposed in substantially confronting relation with each other and a pair of second side walls disposed in substantially confronting relation with each other and connecting the pair of first side walls, wherein the operating part of the adapter is capable of engaging a receiving part provided in the body of the power tool.

9. The adapter-battery pack assembly according to claim 8, wherein one operating part of the adapter is disposed on one of the pair of second side walls, and one receiving part of the adapter is formed in each of the pair of first side walls.

10. The adapter-battery pack assembly according to claim 8, wherein one receiving part of the adapter is formed in one of the pair of second side walls, and one operating part of the adapter is disposed on each of the pair of first side walls.

11. The adapter-battery pack assembly according to claim 7, wherein operation of the operating part of the adapter detaches the adapter from the body of the power tool.

12. The adapter-battery pack assembly according to claim 7, wherein operation of the operating part of the battery pack detaches the adapter from the battery pack.

13. A power tool comprising:
- a motor;
- a battery pack serving as a power source for the motor;
- an accommodating section that opens outward;
- an electric connector disposed adjacent the accommodating section; and
- an adapter that is configured to mount the battery pack to a power tool and supplies power from the battery pack to the motor, the adapter comprising: an insertion part that is inserted into the accommodating section and has a plurality of terminals for electrically connecting with the power tool; a pair of rails that guides insertion of the battery pack in a direction substantially orthogonal to the insertion direction of the insertion part; a tool-latching device including an operating part that attaches the insertion part in and detaching the insertion part from the accommodating section; and a receiving part for attaching to and detaching from the battery pack, wherein the operating part and the receiving part are disposed in different positions when viewing the adapter in the insertion direction of the insertion part.

14. The power tool according to claim 13, wherein the adapter further comprises a base part having a pair of first side walls disposed in substantially confronting relation with each other and a pair of second side walls disposed in substantially confronting relation with each other and connecting the pair of first side walls, wherein the operating part engages a receiving part provided in the body of the power tool, and the receiving part engages an operating part provided in the battery pack.

15. The power tool according to claim 14, wherein one operating part of the adapter is disposed on one of the pair of second side walls, and one receiving part of the adapter is formed in each of the pair of first side walls.

16. The power tool according to claim 14, wherein one receiving part of the adapter is formed in one of the pair of second side walls, and one operating part of the adapter is disposed on each of the pair of first side walls.

17. The power tool according to claim 13, wherein operation of the operating part of the adapter detaches the adapter from the body of the power tool.

18. The power tool according to claim 13, wherein operation of the operating part of the battery pack detaches the adapter from the battery pack.

* * * * *